United States Patent [19]

Antonov

[11] Patent Number: 5,655,984
[45] Date of Patent: Aug. 12, 1997

[54] TRANSMISSION WITH PROGRESSIVE STARTING DEVICE, PARTICULARLY FOR VEHICLES

[75] Inventor: Roumen Antonov, Paris, France

[73] Assignee: Antonov Automotive Technologies B.V., Rotterdam, Netherlands

[21] Appl. No.: 505,304

[22] PCT Filed: Feb. 17, 1994

[86] PCT No.: PCT/FR94/00177

§ 371 Date: Oct. 16, 1995

§ 102(e) Date: Oct. 16, 1995

[87] PCT Pub. No.: WO94/19624

PCT Pub. Date: Sep. 1, 1994

[30] Foreign Application Priority Data

Feb. 18, 1993 [FR] France .................. 93 01840

[51] Int. Cl.[6] .............. F16H 3/64; F16H 49/00; F04C 2/14
[52] U.S. Cl. .............. 475/140; 475/258; 475/259; 475/267
[58] Field of Search .............. 475/43, 104, 140, 475/257, 258, 259, 266, 267; 192/7, 41 R

[56] References Cited

U.S. PATENT DOCUMENTS

| | | | |
|---|---|---|---|
| 2,254,335 | 9/1941 | Vincent | 475/140 X |
| 4,441,691 | 4/1984 | Nagahara et al. | 475/140 X |
| 4,995,862 | 2/1991 | Arocha | 475/86 |

FOREIGN PATENT DOCUMENTS

| | | | |
|---|---|---|---|
| 1341321 | 9/1963 | France . | |
| 2535810 | 5/1984 | France | 475/140 |
| 2623868 | 6/1989 | France . | |
| 2701746 | 8/1994 | France | 475/258 |
| 2359737 | 6/1975 | Germany . | |
| 59-194153 | 11/1984 | Japan | 475/258 |
| 91 13275 | 9/1991 | WIPO . | |

*Primary Examiner*—Khoi Q. Ta
*Attorney, Agent, or Firm*—Kenyon & Kenyon

[57] ABSTRACT

A transmission apparatus in which a differential-type transmission device has rotating elements with intermeshing teeth, one of which elements is connected to an input shaft and the other to an output shaft. One of the rotating elements is a reaction element, and the transmission apparatus has a selective locking mechanism mounted operatively between the reaction element and a housing of the transmission apparatus. The selective locking mechanism has a freewheel for enabling the reaction element to rotate in the same direction as the input shaft and the output shaft when a selective connection device connects the rotating elements of said differential mechanism in order to cause direct drive operation. When the freewheel is locked, the reaction element is integral in rotation with a rotor of a brake which is able to be selectively released in order to release the rotor and the reaction element in relation to said housing. In a neutral condition the brake allows the reaction element to rotate in an opposite direction. The brake is furthermore able to be selectively and gradually activated so as to gradually immobilize the rotor in relation to the housing, whereby the reaction element is then selectively immobilized and allowed to rotate in the same direction as the input and output shafts.

32 Claims, 6 Drawing Sheets

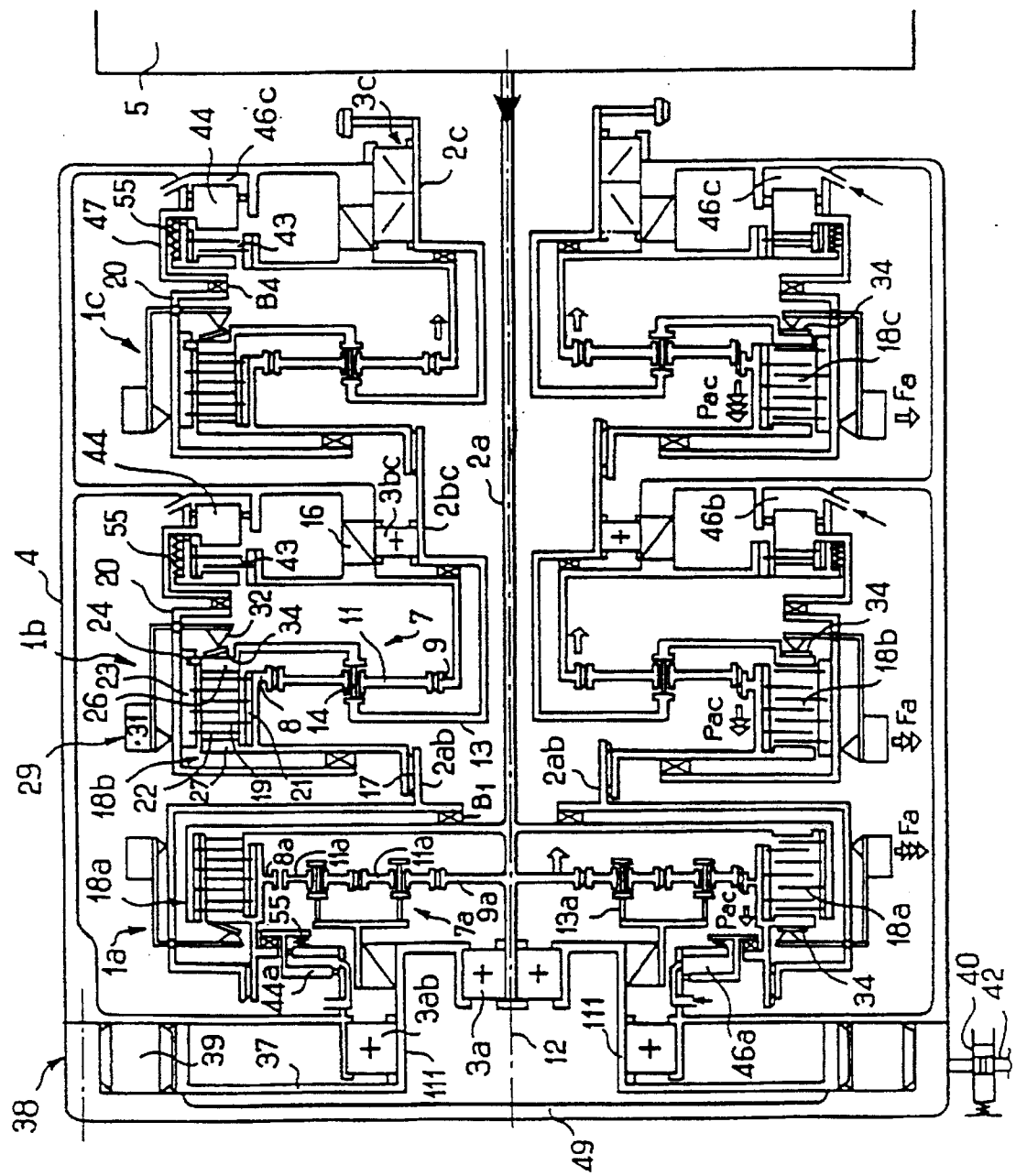
FIG_1

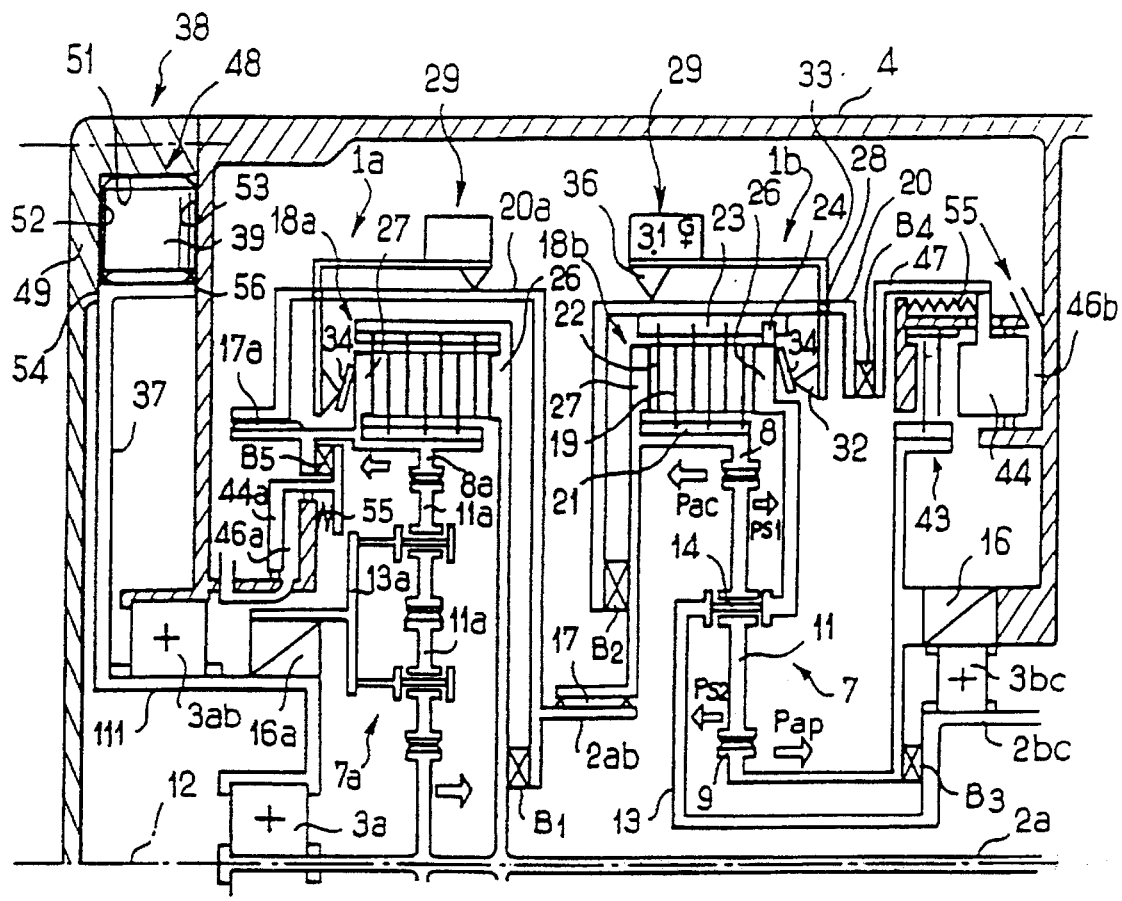
FIG_2
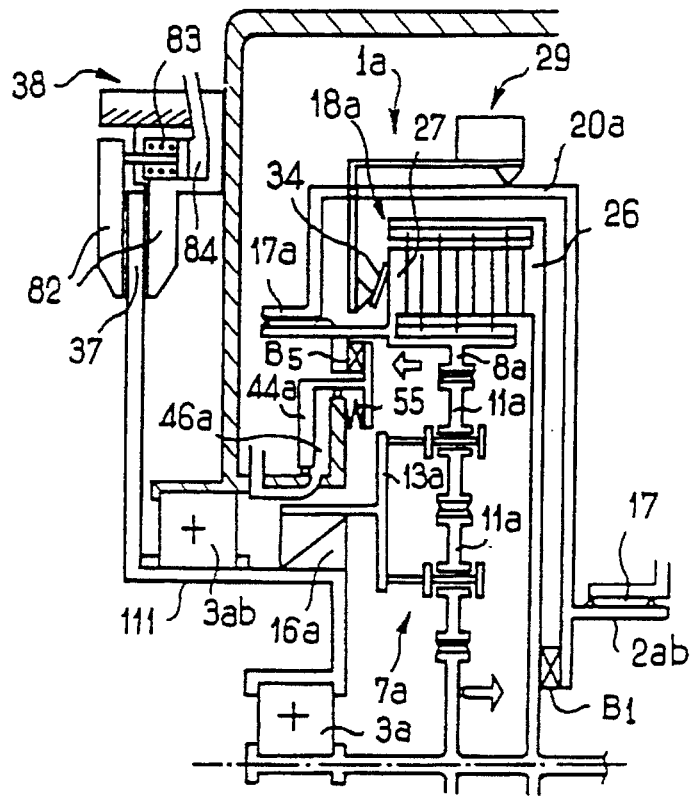
FIG_9

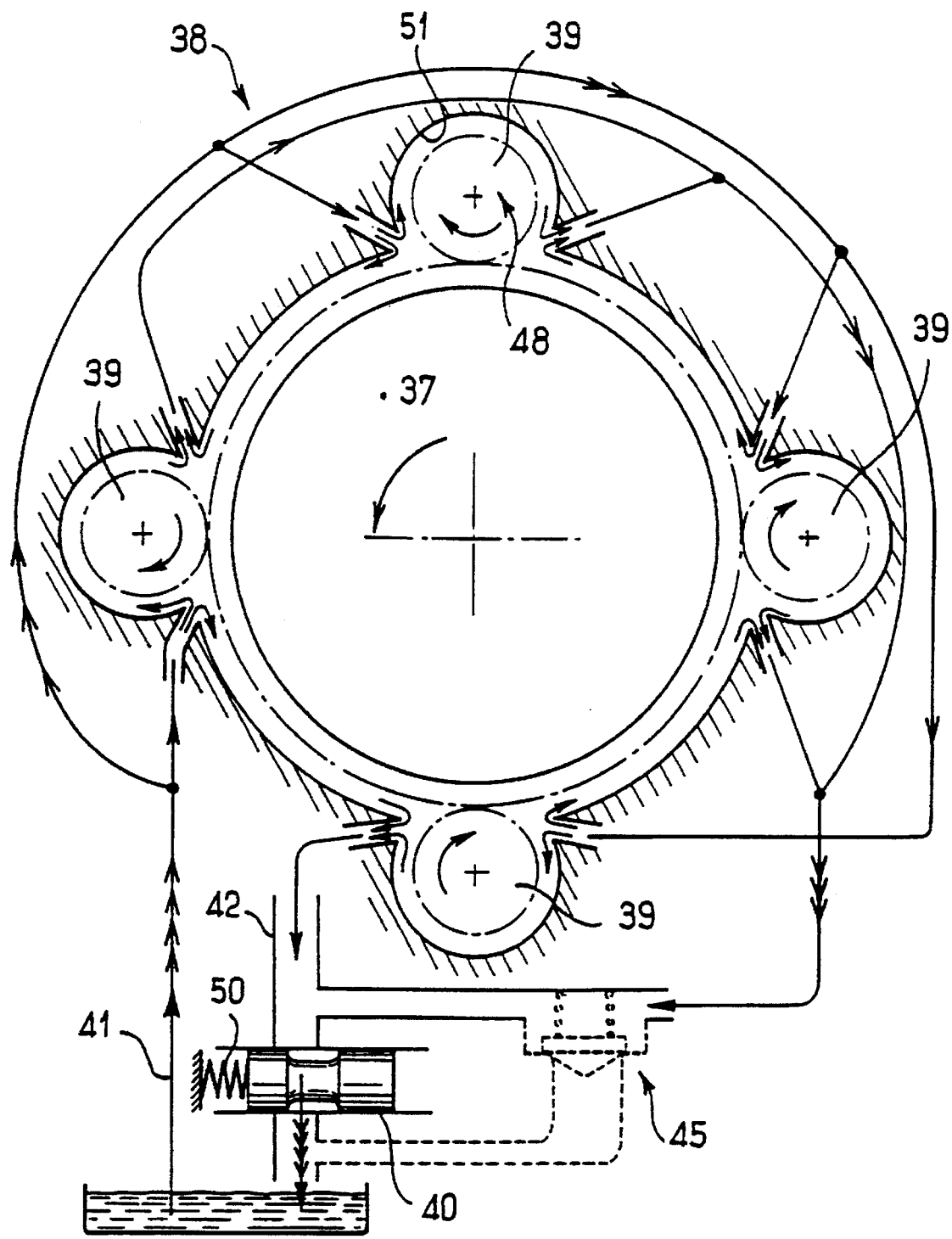
FIG_5

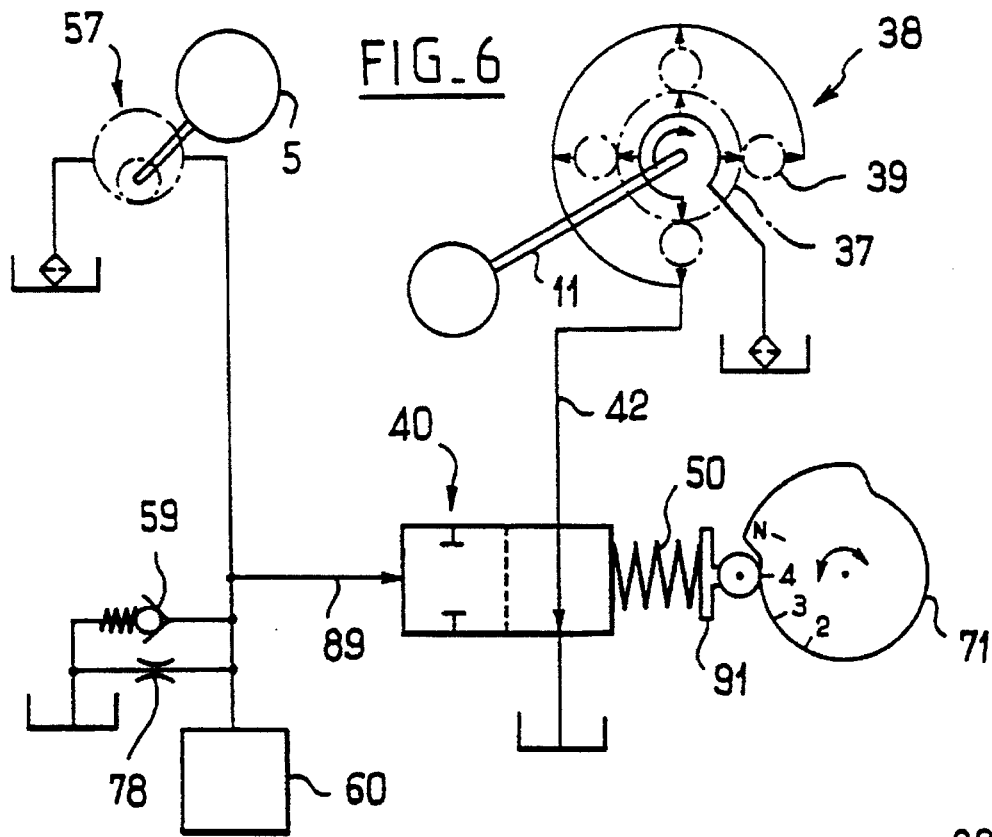
FIG_6
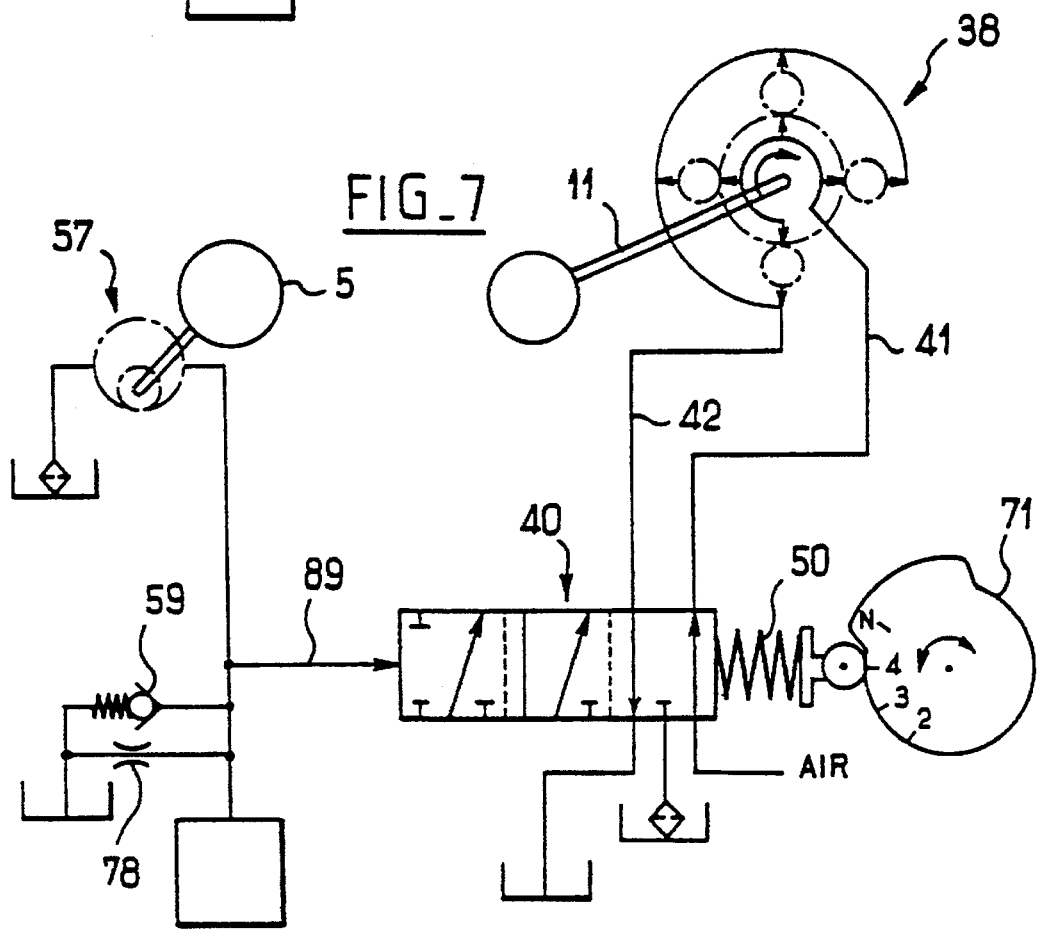
FIG_7

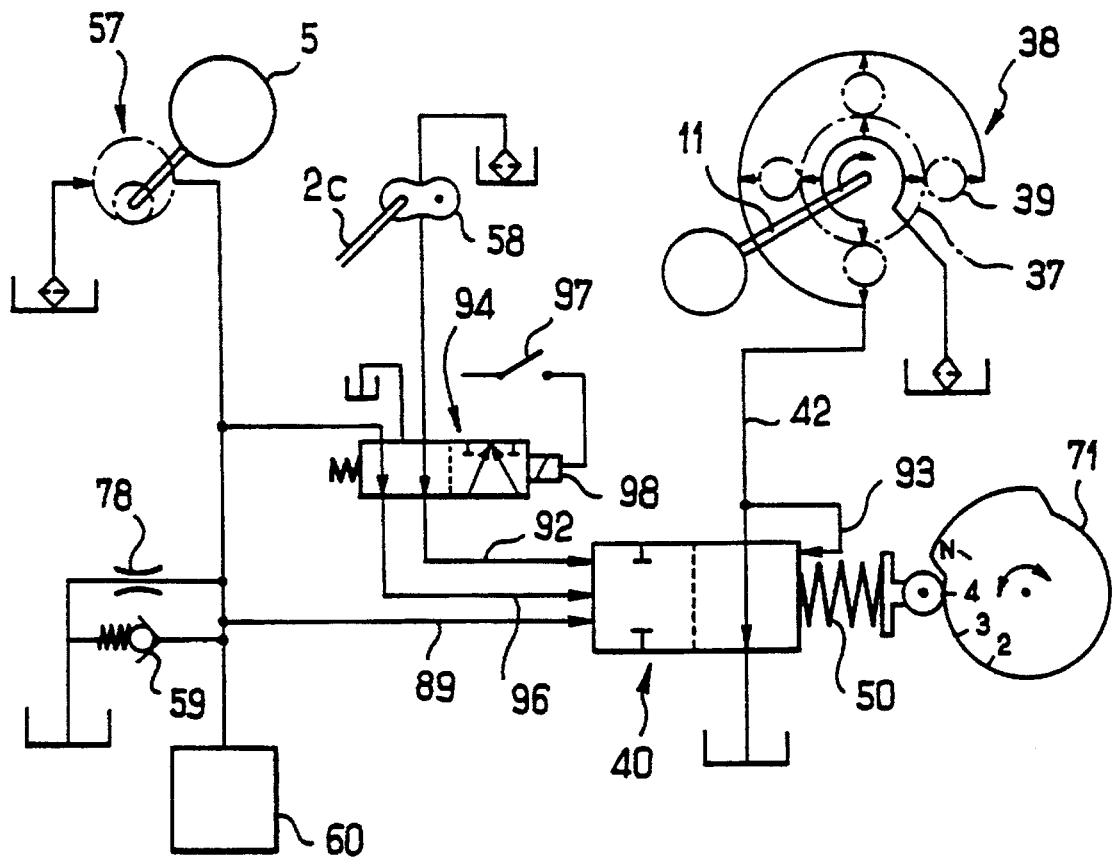
FIG_8

TRANSMISSION WITH PROGRESSIVE STARTING DEVICE, PARTICULARLY FOR VEHICLES

The present invention concerns a transmission apparatus with a gradual start device, in particular for a vehicle.

Conventionally, a vehicle's transmission apparatus comprises a multiple-ratio gearbox controlled manually or automatically and, between this gearbox and the engine, a clutch or hydraulic connecting device to enable the engine to operate when the vehicle is stationary, and to enable the vehicle to be set in motion gradually by the engine once the engine itself has been started.

There is also, in general, an inertia flywheel which is driven in rotation by the engine's shaft and may form one of the clutch plates. The inertia flywheel serves to ensure the continuity of operation of the engine when the clutch is in the released condition and/or when the gearbox is in the neutral position, to enable the engine shaft to pass through the angular ranges where the torque delivered by the engine is negative. When the vehicle is in motion and its driving wheels are coupled to the engine, the inertia of the vehicle is sufficient to maintain the motion of the engine, and then the inertia flywheel even becomes a disadvantage since it adds its own moment of inertia to the inertia of the vehicle's mass during acceleration.

Generally speaking the known clutch, torque converter, hydraulic coupling and inertia wheel devices are expensive, heavy and cumbersome.

WO-A-91 13 275 discloses a transmission apparatus comprising a differential mechanism in which a neutral condition is completed by allowing a reaction member to perform a reverse rotation which is normally precluded by a free-wheel. For allowing such reverse rotation, the stationary part of the free-wheel is released by releasing a brake mounted operatively between said stationary part and the housing of the transmission apparatus. The brake is shown as being a band-brake, according to the solution which is conventional in transmission devices. This type of brake is commercially relevant only if its life time is of the same order of magnitude as the vehicle to which it is fitted, because exchange of the brake is complicated and necessitates at least partial disassembling of the transmission apparatus. Now the brake of this document, performing progressive transition from the neutral condition to the condition where movement is transmitted to the output shaft, has to provide at each gradual start of the vehicle a relatively great amount of kinetic energy, proportional to the mass of the vehicle.

The object of this invention is to provide a transmission apparatus of the kind disclosed in WO-A-91 13 275 but where the brake performing gradual starting does not result in complicated maintenance problems for the transmission apparatus.

According to the invention, there is provided a transmission apparatus in which a differential-type transmission device comprises rotating elements with intermeshing teeth, one of which elements is connected to an input shaft and the other to an output shaft of the device, said rotating elements comprising a reaction element and the transmission apparatus further comprising selective locking means mounted operatively between the reaction element and a housing of the transmission apparatus the selective locking means comprising means having a free-whell function for enabling said reaction element to rotate in the same direction as said input and said output when a selective connection device connects at least indirectly the rotating elements of said differential mechanism in order to cause direct drive operation in which device, at least when the means having a free-wheel function is locked, said reaction element is integral in rotation with an rotor of a brake being able to be selectively released in order to release said rotor and said reaction element in relation to said housing and to cause the transmission system to operate in a neutral condition, and to be gradually activated so as gradually to immobilise said rotor in relation to said housing so as to enable said reaction element to be selectively immobilised and released, respectively, in relation to the housing by the means having a free-wheel function, characterised in that said brake is a disc brake, the disc of which constitute said rotor or in that the brake is an hydraulic pump associated with closure means for closing a delivery pipe of said pump.

These two surprising solutions solve the problem of maintenance of the transmission apparatus. The friction pads of a disc brake are easy to replace when worn out.

The hydraulic pump has a life time which is at least as long as the remaining parts of the transmission.

The brake's rotor is advantageously solid to form an inertia flywheel. This offers the advantage that the said inertia flywheel only rotates when necessary, i.e. when the engine is disconnected from the vehicle's wheels. The inertia load driven by the engine on acceleration is thus reduced, whereby acceleration performance is improved.

A small inertia flywheel may be retained, however, driven directly by the engine's crankshaft to prevent the torsional vibration produced by the engine from being transmitted in its entirety to the transmission apparatus and beyond.

Further features and advantages of the invention will emerge from the following description relating to non-limiting examples.

In the attached drawings:

FIG. 1 is a diagrammatic longitudinal cross-section of a four-ratio transmission apparatus comprising several successive transmission devices according to the invention, in rest position at the top of the Figure and in neutral position at the bottom of the Figure;

FIG. 2 is a large-scale view of the top left-hand part of FIG. 1;

FIG. 5 is a diagrammatic front view of the starter pump shown in FIGS. 1 to 4;

FIG. 6 is an hydraulics diagram for the automatic control of the starter pump;

Figure 3:
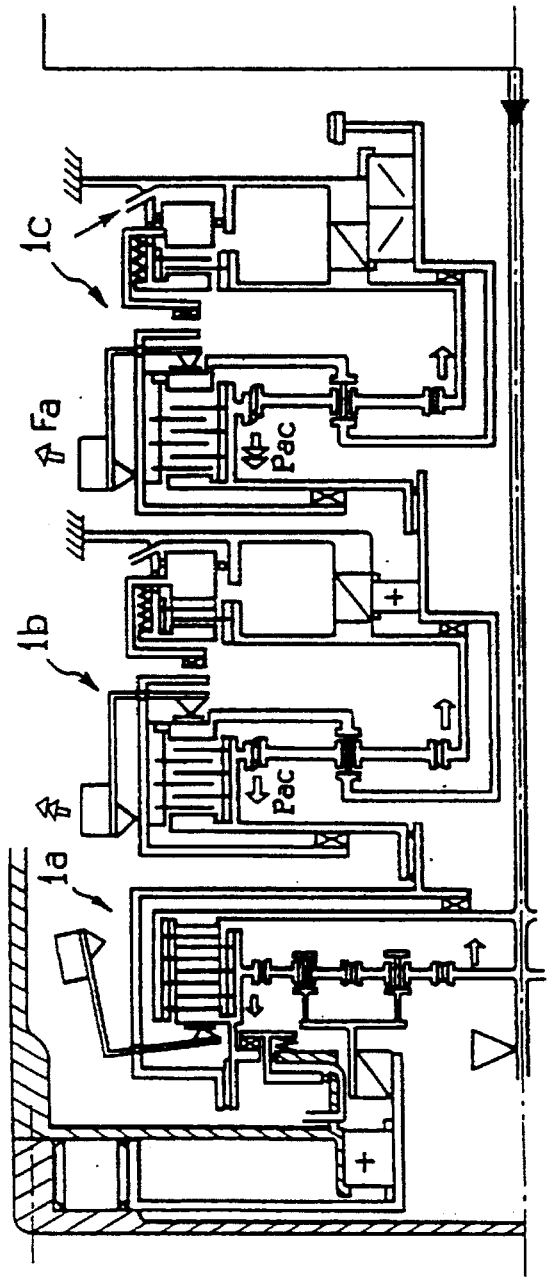
FIGS. 3 and 4 are views similar to the top half of FIG. 1, but relating to operation in 2nd Gear and 4th Gear respectively.

FIGS. 7 and 8 relate to two variants of the hydraulics diagram for the automatic control of the starter pump; and FIG. 9 corresponds to the top left-hand part of FIG. 1, but in the case of a second form of embodiment of the starter brake.

The four-ratio transmission system shown in FIG. 1, intended in particular for a motor-car, comprises three successive transmission devices (or modules) 1a, 1b and 1c, each with two ratios, mounted in series between an input shaft 2a and an output shaft 2c of the transmission system. Input shaft 2a also constitutes the input shaft in module 1a. It is connected to the output shaft of an engine 5 of a vehicle without the intervention of a clutch. Output shaft 2c at the same time constitutes the output shaft of module 1c and comprises a toothed wheel designed to drive by meshing the input of a differential for driving the driving wheels of a vehicle. A manually-operated forward gear/reverse gear reverser may be interposed between the toothed wheel and differential input.

Input shaft 2a runs through the entire transmission system, the first module 1a being the furthest from the vehicle's engine. The third module 1c being is closest to the engine, so that the toothed output wheel is very close to the engine. Modules 1b and 1c are arranged around input shaft 2a without being connected in rotation to the latter.

Along centre line 12 of the transmission system, between input shaft 2a and output shaft 2c, there are two successive intermediate shafts 2ab, 2bc, which each constitute the output of module 1a, 1b respectively located upstream, and the input shaft of module 1b, 1c respectively located downstream. Input shaft 2a, intermediate shafts 2ab, 2bc and output shaft 2c are fixed axially in relation to transmission housing 4. For this reason, input shaft 2a is supported in rotation, and axially fixed, in a hub 111 by means of a bearing 3a. Hub 111 is itself supported in rotation, and axially fixed, in relation to housing by a bearing 3ab. Intermediate shaft 2ab if axially fixed by axially resting, with relative freedom of rotation, against input shaft 2a by means of an axial stop B1. Intermediate shaft 2bc and output shaft 2c are each supported by a roller bearing 3bc, 3c relative to housing 4.

Each module is capable of reducer or direct-drive operation. A first ratio is achieved when the three modules work in reducer operation, a second ratio when the first module 1a works in direct-drive and the other two in reducer operation, a third ratio with the first two modules 1a and 1b in direct-drive and the third 1c in reducer operation, and a fourth ratio with the three modules in direct drive.

There now follows a more detailed description of module 1b, with reference to FIG. 2, this description being valid also for module 1c which is identical to module 1b except that its input shaft is shaft 2bc and that its output shaft is shaft 2c supported by bearing 3c.

An epicyclic train 7 comprises a crown wheel 8 with internal teeth and a sun gear 9 with external teeth, both meshing with planet gears 11 supported, at equal angular intervals around centre line 12 of the transmission device, by a planet gear carrier 13 connected rigidly to output shaft 2bc. Planet gears 11 can swivel freely around eccentric trunnions 14 of planet gear carrier 13. Sun gear 9 can turn freely around centre line 12 of the transmission device in relation to output shaft 2bc which it surrounds. However, a freewheel device 16 prevents sun gear 9 from turning backwards, i.e. in the opposite direction to the normal direction of rotation of input shaft 2ab, in relation to transmission housing 4.

Crown wheel 8 is connected in rotation, but free to slide axially in relation to input shaft 2ab of the module, by means of splines 17.

A clutch 18b is arranged around crown wheel 8. It comprises a stack of annular discs 19 alternating with anular discs 22. The discs 19 are connected in rotation to crown wheel 8 and can slide axially. For this purpose, discs 19 have internal teeth engaged in splines 21 integral with crown wheel 8. Discs 22 are connected in rotation, and can slide axially with respect to planet carrier 13. For this purpose, a cage 20 has, on its radially internal face, splines 23 in which are engaged in an axially sliding manner on one side the external teeth of discs 22 and on the other side the external teeth 24 of planet gear carrier 13.

The stack of discs 19 and 22 may be squeezed axially between a retaining plate 26 integral with planet gear carrier 13 and a movable plate 27 which is integral with crown wheel 8. Plate 27 is therefore axially movable with crown wheel 8.

Cage 20 supports centrifugal fly-weights 29 arranged in a ring around clutch 18b.

The fly-weights are therefore connected in rotation to output shaft 2bc of module 1b to which they belong.

Each fly-weight has a solid body 31 located radially round the outside of discs 19 and 22 and an activator tip 32 resting against an external face of retaining plate 26 by way of a Belleville spring 34. Tip 32 is connected to solid body 31 by an angle arm 33 pivoting on cage 20 around a geometrical axis 28 positioned tangentially in relation to centre line 12 of the device. WO-A-91/13275 describes advantageous arrangements for the articulated mounting of such fly-weights. The centre of gravity G of the fly-weight is located inside or close to solid body 31, in a position which in relation to axis 28 is at set distance measured parallel to centre line 12 of the device.

Figure 4:
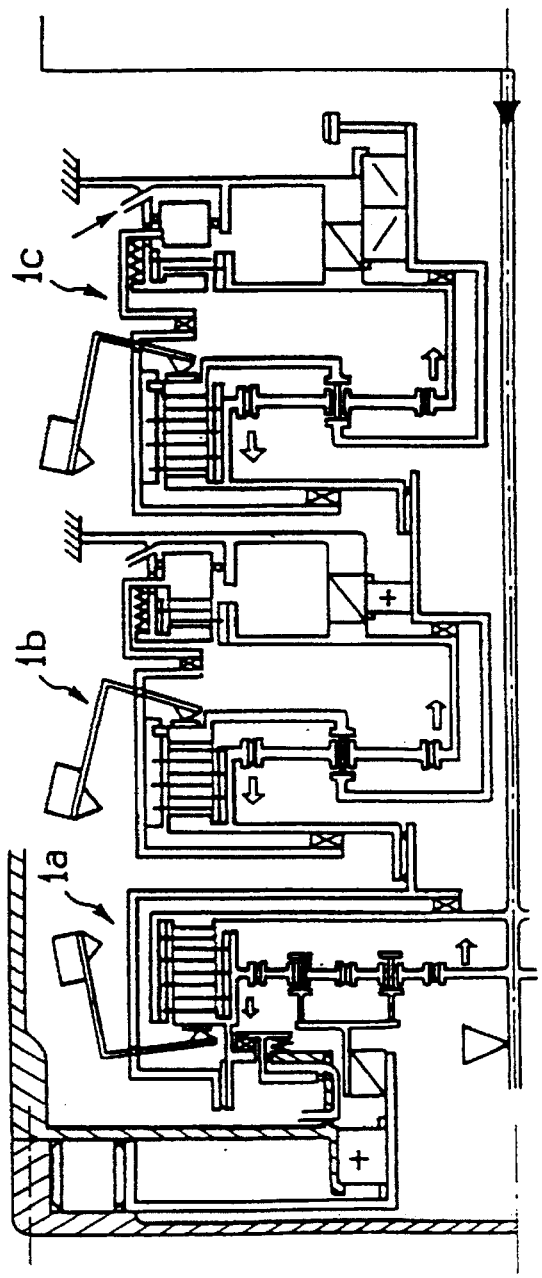

Thus, the rotation of planet gear carrier 13 tends to make the bodies 31 of fly-weights 29 pivot radially outwards around their tangential axis 28 under the influence of their centrifugal force Fa, causing them to move from a position of rest defined by a stop 36 against cage 20 to a distanced position, as shown in FIG. 4.

This then results in a relative axial displacement between tip 32 and fly-weight pivot axis 28 and therefore between tip 32 and cage 20. In relation to the direction of displacement corresponding to the centrifugal distancing of fly-weights 29, cage 20 is rested axially against crown wheel 8, with relative freedom of rotation, by an axial stop B2.

Thus, the displacement of cage 20 in relation to tip 32 causes a relative movement which draws together tip 32 and movable plate 27 of clutch 18b. This relative movement may correspond to a confession of Belleville spring 34 and/or to a movement of movable plate 27 towards fixed plate 26 in the direction of engagement of clutch 18b.

When the transmission system is at rest as shown at the top of FIG. 1 and in FIG. 2, Belleville spring 34 transmits to cage 20, by means of fly-weights 29 with their stop at rest, a force which engages clutch 18b so that input shaft 2ab of module 1b is connected in rotation with output shaft 2bc and the module assumes direct-drive operation capable of transmitting torque up to a set maximum defined by the holding force of the Belleville spring.

The teeth of crown wheel 8, planet gears 11 and sun gear 9 are helical. Thus, in each pair of teeth meshing under load, opposing end thrusts occur which are proportional to the circumferential force transmitted and therefore to the torque on input shaft 2ab and the torque on output shaft 2bc. The helical pitch angle of the teeth is selected so that the direction of end thrust Pac originating in crown wheel 8 when the latter transmits a torque is such that movable place 27, drawn axially by crown wheel 8, moves away from clutch retaining plate 26. Planet gears 11, which mesh not only with crown wheel 8 but also with sun gear wheel 9, undergo two opposing axial reactions PS1 and PS2, which balance each other, and sun gear 9, taking into account its meshing with planet gears 11, undergoes an end thrust Pap which is equal in intensity and opposed in direction on end thrust Pac of crown wheel 8. Thrust Pap of sun gear 9 is transmitted to housing 4 through a stop B3, planet gear carrier 13 and bearing 3bc. Thus, end thrust Pac is exerted upon movable clutch plate 27 and with respect to housing 4, and therefore to clutch retaining plate 26, in the direction tending to release clutch 18b. This force, transmitted by stop B2 to cage 20, also tends to bring tip 32 of fly-weights 29 and retaining plate 26 closer together, and thus to keep fly-weights 29 in their at rest position and compress Belleville spring 34.

This is the situation represented in FIG. 3. Assuming that this situation has been reached, there now follows a description of the basic operation of module 1b. As long as the torque transmitted to the module by input shaft 2ab is such that end thrust Pac in crown wheel 8 is sufficient to compress Belleville spring 34 and keep fly-weights 29 in the at rest position shown in FIG. 3, the distance between retaining plate 26 and movable plate 27 of the clutch is such that discs 19 and 22 slide against each other without transmitting torque to each other. In this case, planet gear carrier 13 can rotate at a different speed to that of input shaft 2ab, and tends to be immobilised by the load which must be driven by the module's output shaft 2bc. Consequently, planet gears 11 tend to act as movement reversers, i.e. to make sun gear 9 turn in the opposite direction to the direction of rotation of crown wheel 8. But this is prevented by free wheel 16. Sun gear 9 is thus immobilised by free wheel 16 and planet gear carrier 13 turns at a speed which falls between the zero speed of sun gear 9 and the speed of crown wheel 8 and input shaft 2ab. The module thus works in reducer operation. If the speed of rotation increases and provided the torque retains unchanged, a point is reached where the centrifugal force produces a axial drawing-in force between retaining plate 26 and movable plate 27 greater than end thrust Pac, and movable plate 27 is pushed towards plate 26 to achieve direct drive.

When clutch 18b is engaged, the teeth of epicyclic train 7 no longer work, i.e. they no longer transmit any force and therefore do not generate any end thrust. Thus, the end thrust due to centrifugal force can exert itself fully so as to draw plates 26 and 27 together. This now enables a better understanding of the process of passing into direct drive: as soon as discs 19 and 22 begin to rub against each other and transmit part of the power, the teeth are discharged to the same extent, end thrust Pac decreases by the same amount and the supremacy of the centrifugal force becomes increasingly more dominant until clutch 18b fully enables direct drive.

It may well be that the speed of rotation of output shaft 2ab then decreases, and/or the torque to be transmitted increases, to the point that fly-weights no loner provide a sufficient drawing-in force in clutch 18b to transmit the torque. In this case, clutch 18b starts to slip. The speed of sun gear 9 decreases until it reaches zero. Free wheel 16 immobilises the sun gear and tooth fore Pac will re-emerge to disengage the clutch so that the module will then work in reducer operation. Thus, each time that a change between reducer operation and direct drive operation occurs, axial force Pac changes to the direction that stabilises the newly-established transmission ratio. This is highly advantageous on the one hand to avoid incessant changes in ratio around certain critical points of operation, and on the other to ensure that the slipping of clutch 18b is only temporary.

Belleville spring 34 has a dual purpose. On the one hand, by drawing in the clutches when the transmission system is at rest, it achieves a mechanical connection between the input and output shafts of the module. Since this function is ensured in all three modules, when the vehicle is stationary it is held back by the engine when the latter has itself stopped. If clutch 18b were released when at rest, the vehicle would not be prevented from moving freely forwards since in this case the imobilisation of crown wheel 8 by engine 5 would make sun gear 9 turn in the normal direction, unprevented by free wheel 16.

On the other hand, Belleville spring 34 enables the module to work in direct drive for relatively slow speeds where the centrifugal force, proportional to the square of the speed, would be so low that even a very small torque to be transmitted would cause, in a manner undesirable in practice, the maintenance of or a tendency to return to reducer operation.

The differences between module 1a as compared to module 1b are now described.

The use of an epicyclic train with the input on the crown wheel and the output on the planet gear carrier does not easily enable reduction ratios higher than 1.4:1 to be achieved. With such a ratio, the reduction in the speed of the engine when passing into 2nd gear would be 40%. This is a little low for passing from first to second gear. If the input is through the sun gear and the output through the planet gear carrier the reduction ratio is in practice at least 3, which is too high. By contrast, practically any reduction ratio can be achieved with the input through the sun gear and the output through the crown wheel, but in this case the crown wheel turns in the opposite direction to the sun gear, which is an inadmissbile defect since the direction of rotation of the crown wheel would not be the same when the module were working in direct drive operation and reducer operation.

In order to resolve all these difficulties at a stroke, module 1a has its input shaft 2a connected to sun gear 9a, its output shaft 2ab driven by crown wheel 8a, and in order that the direction of rotation of crown wheel 8a is the same as that of sun gear 9a even during reducer operation, each planet gear is replaced by a cascade of two planet gears 11a meshing together and one meshing with sun gear 9a and the other with crown wheel 8a. Planet gear carrier 13a is connected to hub 111 by free wheal 16a.

Hub 111 is integral with impeller 37 of starter brake 38. As FIG. 5 also shows, brake 38 comprises a gear pump the impeller 37 of which comprises a driving sun gear driving four pumping planet gears 39 which are hydraulically in parallel with each other between a suction port 41 and delivery port 42 which can both be connected to a lubrication oil reservoir in the transmission system. A valve 40 is fitted in delivery pipe 42 so as selectively to enable or prevent the flow of oil through the pump, or even create a loss of head adjustable at the pump's outlet. When valve 40 is closed, the oil, prevented from flowing, stops the pump, so that impeller 37 can no longer tun and free wheel 16a enables planet gear carrier 13a to turn only in the normal direction. If, by contrast, valve 40 is open, impeller 37 turns freely. In this case, planet gear carrier 13a can turn in the opposite direction driving hub 111 with it by means of free wheel 16a, which causes pumping in the direction shown in FIG. 5. Valve 40 is caused to open so as automatically to achieve a neutral condition, i.e. to disconnect the input 2a and output 2c shafts when the vehicle is stationary (output shaft 2c immobile) whilst input shaft 2a is turning. It is due to this function that the clutch or torque converter usually mounted between engine 5 and the transmission system can be done away with. In order to cause the gradual setting in motion of output shaft 2c, valve 40 is gradually closed so as gradually to stop impeller 37 by means of an increasing loss of head through valve 40.

A variant would be to mount in parallel with valve 40 a non-return valve 45 enabling the oil to circumvent valve 40 if it tends to flow in the opposite direction to that shown in FIG. 5, i.e. if the oil tends to be taken in through delivery port 42, and discharged through suction port 41. Due to this non-return valve 45, free wheel 16a can be done away with, the free wheel's function being performed hydraulically by non-return valve 45. This solution avoids the need for the non negligible space occupied by a free wheel, but introduces a loss by hydraulic friction when module 1a is working in direct drive, a situation in which planet gear carrier 13a turns in the normal direction at the same speed as input shaft 2a.

As FIG. 2 also shows, the hydraulic pump forming part of brake 38 is made in a particularly simple way: each planet gear 39 is simply enclosed in a cavity 48 of a cover 49 fixed against the end of housing 4 opposite engine 5. The peripheral surface 51 of the cavities is in oil-tight contact with the tips of the teeth of planet gears 39 and the base surface 52 of cavities 48 as well as the outer end face 53 of housing 4 are in oil-tight contact with the two radial faces of each planet gear 39. Furthermore, impeller 37 has, on both sides of its teeth, two opposing annular faces 54 and 56 one of which is in oil-tight contact with the inner base of cover 49 and the other with outer face 53 of housing 4. The various oil-tight contacts of the tips of the planet gear teeth and the radial faces of the planet gears with cover 49 and housing 4 also guide the planet gears on rotation.

Cage 20a for fly-weights 29 of module 1a is, as in the other modules 1b and 1c, integral in rotation with the module's output shaft 2ab, but is also integral with the latter axially. Cage 20a, and with it pins 28 and fly-weights 29, do not therefore have any axial mobility.

By contrast, tips 32 of fly-weights 29 no longer rest on retaining plate 26, but on movable plate 27 of clutch 18a, still by means of a Belleville spring 34. Movable plate 27 is, like in the other modules, integral with crown wheel 8a, which is axially mobile due to splines 17a in relation to cage 20a connected in rotation to output shaft 2ab. Retaining plate 26 is integral with input shaft 2a.

The operation of module 1a is similar to that of modules 1b and 1c. The fly-weights or Belleville spring 34 tend to draw in clutch 18a with a force which determines the maximum transmittable torque, and during reducer operation the axial force of the helical teeth of crown wheel 8a pushes movable plate 27 in the clutch release direction.

There now follows an explanation of the general operation of the three modules 1a, 1b and 1c.

Taking the case where all the modules 1a–1c are working in reducer operation (bottom part of FIG. 1), whereby the first ratio of the transmission device is achieved, the speed is highest and torque lowest in module 1a, as illustrated by a triple arrow Fa and a single arrow Pac. This first module 1a is therefore the first to pass into direct drive operation when the vehicle accelerates, as shown in FIG. 3. The torque decreases in the second module 1b, since it is no longer increased by the gearing down in the first module, but the speeds of rotation in the second module remain unchanged and therefore lower than those in the first module just before the change, since they are caused by the speed of rotation of the vehicle's wheels. It is therefore necessary for the vehicle's speed to increase further before the second module can in its turn reach the conditions for passing into direct drive if the torque delivered by the engine remains unchanged; and so on until all the modules of the transmission device are in direct drive as shown in FIG. 4. Thus, the modules, all essentially identical, organise themselves spontaneously to achieve a stepped passage of speed ratios. The differences described concerning module 1a have no effect in this regard.

For ensuring that, moment the modules which work in direct drive in a given situation, the one which shifts down is always the one which is closest operationally to output shaft 2c, it is to be expected that the closer the modules are operationally to the output shaft the fewer, or lighter, their fly-weights, or the fewer the discs in their clutches. But it is a simple matter of introducing slight differences in the response to the torque transmitted, with variations of a few % in each module by comparison with the neighbouring one.

There now follows a description with reference to FIG. 2 and relating to module 1b of the additional means provided in modules 1b and 1c to make such modules work selectively in reducer operation in conditions different to those created by the axial forces of Belleville spring 34, centrifugal fly-weights 29 and the teeth of crown wheel 8.

For this purpose, module 1b has a brake 43 which enables sun gear 9 to be immobilised in relation to housing 4, independently of free wheel 16. In other words, brake 43 is mounted operationally in parallel with free wheel 16 between sun gear 9 and housing 4. A hydraulic piston 44 is mounted axially slidling selectively to apply and release brake 43. Brake 43 and piston 44 are ring-shaped having centre line 12 of the transmission system as their own centre line. Piston 44 is adjacent to a hydraulic chamber 46(b?) which may be selectively supplied with oil under pressure to push piston 44 in the direction of applying brake 43, in opposition to the action of a return spring 55.

Moreover, piston 44 is connected rigidly to a pusher 47 which can rest against cage 20 by means of an axial stop B4. The assembly is such that when the pressure in chamber 46b pushes piston 44 into the position of applying brake 43, cage 20, before brake 43 is applied, is pushed sufficiently for clutch 18b to be released.

Thus, when piston 44 is in the position of applying the brake, sun gear 9 is immobilised even if planet gear carrier 13 tends to turn faster than crown wheel 8, as is the case in hold-back operation, and consequently the module works in reducer operation, as it is enabled to do by clutch 18b being released.

Assembly 43, 44, 46b and 47 described above thus constitutes a means which can be made available to the vehicle's driver to make the module work in reducer operation when he wishes to increase the engine braking effect, for example when going downhill.

We saw above that the Belleville springs 34 place all the modules in direct drive when the vehicle is stationary. On moving off, the emergence of tooth forces Pac must therefore make all the modules pass into reducer operation so that on moving off the system is in the first ratio. This may create an unwelcome systematic juddering. To avoid this, the brake 43, piston 44 and pusher 47 assembly places module 1b in its "reducer" state when the motor is turning over but output shaft 2c has not yet been set in motion, so that the transmission system operates on its first transmission ratio right from the start of setting output shaft 2c in motion.

Means not shown, for example manually-operated means, are provided selectively to supply hydraulic chamber 46b with a view to the functions described above. It is thus possible, for example, to make the module work in reducer operation under conditions where the balance between the tooth forces and the force of spring 34 and that of fly-weights 29 would have led to direct drive operation.

Module 1c has a brake 43, a piston 44, a chamber 46c and a pusher 47 as well as a stop B4, identical to those of module 1b.

By contrast, module 1a is different. It does have a piston 44a adjacent to a hydraulic chamber 46a, but there is no brake like 43 in parallel with free wheel 16a, and moreover piston 44 acts through a stop B5 not on cage 20a which is axially immobile, but on crown wheel 8a and movable plate 27 of clutch 18a in the direction of releasing clutch 18a. The aim of this assembly is simply to enable clutch 18a to be released when the vehicle is stationary but shaft 2a is already rotating, as enabled if valve 40 is in the open position. Piston 44a may also be used to encourage reducer operation for so-called "racy" driving. By contrast, piston 44a cannot be used to achieve reducer operation when the engine is in hold-back operation. It has in fact been considered pointless in practice to create the possibility of hold-back operation on the transmission's first ratio.

We shall now return to FIGS. 1, 3 and 4 with reference to the different conditions of the transmission system as a whole.

In FIG. 1, top part, the transmission system is at rest in direct drive operation since all the clutches 18a, 18b, 18c are engaged and starting brake 38 is blocked as valve 40 is held in the closed position by its return spring 50. Pistons 44 and 44a are pushed towards their inactive position by the action of return springs 55.

In the situation shown at the bottom of FIG. 1, valve 40 is shown in the open position so as to release impeller 37. Hydraulic chambers 46a, 46b, 46c are shown to be suplied so as to release clutches 18a, 18b and 18c and compressing the corresponding Belleville springs 34, as well as the return springs 55 of the pistons. This is the situation when the engine 5 is, for example, idling, when output shaft 2c is immobile (vehicle stationary). Starting device 38 then enables input shaft 2a to turn without any rotation of output shaft 2ab of module 1a, and without any rotation in the other two modules 1b and 1c. Planet gear carrier 13a and hub 11 turn in the opposite direction to normal to enable this situation. In this stage, impeller 37 adds its inertia effect to that of the conventional flywheel of thermal engine 5. This is highly advantageous since the flywheel of a thermal engine is useful chiefly during idling to prevent the engine, not connected to an inertial load, from being unable to continue its rotation when one of the pistons of the thermal engine reaches the end of its gas compression stroke. By contrast, during normal operation, the flywheel of a traditional thermal engine hinders the vehicle's acceleration performance. With impeller 37 turning only when the vehicle is stationary, on the one hand the same idling stabilisation is achieved with a smaller flywheel on engine 5, and furthermore the inertia of impeller 37 disappears during normal operation since impeller 37 is then stopped.

To pass from neutral operation corresponding to the situation just described for the bottom of FIG. 1 to the operating situation as per the first transmission ratio, valve 40 is gradually closed to set output shaft 2ab of the first module gradually in rotary motion and this motion is transmitted by being reduced in speed in each module until output shaft 2c. As soon as the vehicle reaches a certain speed, five kilometres/hour for example, the pressure in hydraulic chambers 46a, 46b and 46c can be released to enable tooth forces Pac, centrifugal forces Fa and the elastic forces of springs 34 to play their role in the automatic control of the assembly, as described above.

Starting at the situation where the transmission system is in direct drive, hydraulic chamber 46c of module 1c can be supplied to activate brake 43 and at the same time bring clutch 18c of this module to the released position. Thus, piston 44 of this module forces the latter into reducer operation, either create a greater engine braking effect or to initiate the return to reducer operation quickly for the purpose of sharp acceleration.

We shall now describe, with reference to FIG. 6, an hydraulics diagram for the automatic control of starter brake 38.

In a manner not shown in FIGS. 1 to 5, there is provided at the input shaft of the transmission system an hydraulic inlet pump 57 which is driven by shaft 2a and thus turning at the speed of engine 5. Inlet pump 57 supplies a lubrication circuit 60 of the transmission system, only shown diagrammatically. Furthermore, pump 57 discharges to the atmosphere through a throttle 78 so that the pressure at the outlet of pump 57 is a function of the speed of rotation of his pump, i.e. of the speed of rotation of the shaft of engine 5. Mounted in parallel with throttle 78 there is a relief valve 59 which limits the pressure in the delivery circuit of pump 57 to, for example, 200 kPa. Consequently, this pressure increases up to a speed of rotation of, for example, 2,000 rpm, and is then constant, equal to 200 kPa.

The delivery pressure of pump 57 is applied to a control inlet 89 of hydraulic valve 40 tending to move this valve 40 from the open position, in which it tends to be kept by spring 50, towards the closed position.

A manually-operated cam 71 is capable of moving between various positions "4", "3", "2" and "N". Positions "4", "3" and "2" correspond to controls for the supply of hydraulic chambers 46a, 46b and 46c. Position "N" is a neutral position, in which counter-brace 91 of spring 50 is moved towards valve 40 so as to compress spring 50 even when valve 40 is in the open position, and thus prevent valve 40 from moving into the closed position whatever the pressure at control inlet 89.

The operation of this hydraulic circuit is as follows:

When cam 71 is in the "N" position, valve 40 is compulsorily in the open position so that brake 38 is compulsorily released so as to create a disconnection situation between transmission input and output shafts 2a and 2c.

When cam 71 is on one or other of positions "4", "3" or "2", and engine 5 is turning at idling speed (about 800 rpm), the force of spring 50 is greater than that produced by the pressure at inlet 89 and valve 40 is in the open position.

If the driver increases the speed of rotation of engine 5, the pressure at control inlet 89 increases gradually and gradually causes valve 40 to move into the closed position. Spring 50 is designed to oppose a return force which sharply increases as valve 40 moves towards the closed position, so as to avoid a sudden movement. The mere valve 40 closes, the more the pressure in delivery circuit 42 of brake 38 increases. This causes crown wheel 8a of module 1a, and consequently transmission output shaft 2c gradually to start rotating.

The example shown in FIG. 7 shall only be described as regards its differences in relation to that shown in FIG. 6.

In this example, spring 50 tends to move valve 40 towards a third position in which not only the delivery pipe 42 of starter pump 38 is open but also the suction pipe 41 of starter pump 38 is connected to the air. Valve 40 is in this position when the pressure at control inlet 89 is lower than that at normal idling speed, and corresponds for example to 500 rpm, indicating that the engine is on the point of stalling. In this case, there is no longer any hydraulic friction in starter pump 38 since the latter is drawing in air. This can enable engine 5 to recover its normal speed of rotation. This is particularly true if the tendency of the engine to stall derives from a particularly low temperature, due to which the oil has high viscosity, producing a strong resistance to rotation in starter pump 38 even if delivery pipe 42 is open.

If engine 5 is running at its normal idling speed, about 800 rpm, valve 40 is in an intermediate position in which, as with the open position shown in FIG. 6, starter pump 38 draws in oil and delivers the latter freely at atmospheric pressure.

The third position of valve 40 is the closed position of delivery pipe 42. The gradual starting of the vehicle is performed as in the case shown in FIG. 6 by a gradual movement of valve 40 from the position where the oil is drawn in and freely delivered, to the position where the delivery pipe is closed.

In the example shown in FIG. 8, which will only be described as regards its differences in relation to that shown in FIG. 6, there is, in addition to pump 57, an hydraulic outlet pump 58, located at the transmission output shaft or downstream of this output shaft. Outlet pump 58 is designed as a tachometric pump delivering a pressure constituting a proportion of the transmission output shaft's speed, in other words a proportion of the speed of rotation of the vehicle's driving wheels.

Valve 40, on the same side as control inlet 89, has a second control inlet 92 which is connected to the delivery pipe of outlet pump 58. There are therefore two parameters which tend to make valve 40 move into the closed position, namely the speed of rotation of engine 5 and the speed of the vehicle's driving wheels.

Furthermore, the pressure prevailing in delivery pipe 42 of starter pump 38 constitutes a precise proportion of the torque transmitted to the vehicle's wheels. In the example, this pressure is used as a couter-reaction parameter, applied to a couter-reaction inlet 93 in order to tend to keep valve 40 in the most open position when the torque transmitted is highest. Thus, on the one hand jolts are dampened on the reopening of valve 40 when the torque transmitted becomes too high. On the other hand, when the torque transmitted is high, the clutch engagement process is prolonged until the vehicle and engine reach higher speeds, which optimises the engine's acceleration performance from when the vehicle is stationary.

It will be noted that couter-reaction inlet 93 would be equally effective with a structure in other respects identical to that described in FIG. 6 or FIG. 7, i.e., with the "speed" information provided solely by a pump 57 located on the transmission system's input shaft.

The example shown in FIG. 8 also illustrates a gradual-operation valve 94 which, in the normal open position, places control inlet 92 in communication with the outlet of tachometric pump 58 as described above and also connects to the delivery pipe of inlet pump 57 a third inlet 96 of valve 40, located on the same side as the first and second inlets.

By contrast, when a contact 97 is operated to activate a solenoid 98, gradual-operation valve 94 moves into a position in which second and third inlets 92 and 96 are put at atmospheric pressure. This is useful on slippery ground, for example on snow. In particular, the influence of the speed of rotation of the vehicle's wheels is eliminated. Thus skidding of the wheels does not make valve 40 move suddenly into the closed position. Moreover, by eliminating the influence of wheel speed and reducing that of engine speed (neutralisation of control inlets 92 and 96 respectively), the setting in motion process is made to extend over a wide range of engine speeds of rotation. Thus gradual operation is markedly increased so as to reduce the starting torque applied to the wheels and consequently, reduce the risk of skidding.

In the example shown in FIG. 9 which will be described only as regards its differences as compared to that shown in FIG. 2, brake 38 is no longer a hydraulic pump but a disc brake. The brake's impeller 37 is a disc integral with hub 111. Dics 37 co-operates with callipers 82 fixed to housing 4, thus prevented from turning around centre line 12. A spring 83 tends permanently to grip callipers 82 and thus immobilise hub 111. In this case free wheel 16a enables planet gear carrier 13a to turn only in the normal direction. An hydraulic jack 84 may be supplied to move the callipers apart in opposition to the force exerted by the spring. In this case, planet gear carrier 13a may turn in the opposite direction driving hub 111 it by means of free wheel 16a, so as to achieve the neutral condition.

In order gradually to set the vehicle in motion, the pressure in jack 84 is gradually released.

Starter brake 38 is mounted externally, at the free end (opposite engine 5) of housing 4, so that if necessary the friction linings of callipers 82 may be changed in a very simple maintenance operation.

This arrangement is made possible, in the example, by the fact that the first module 1a has been moved to the free end of housing 4 instead of being at the engine end, and also to the fact that output shaft 2ab of the first module 1a is connected to crown wheel 8a of its epicyclic train. In fact it will be seen that if crown wheel 8a had been connected to input shaft 2a of module 1a (as is the case in modules 1b and 1c), there would have been on the epicyclic train 71 side opposite engine 5, a radial flange connecting shaft 2a and crown wheel 8a, and this flange would have prevented, from this side of the epicyclic train, any direct connection between the planet gear carrier and the outside of the housing. This particular arrangement of epicyclic train 7a in the first module 1a therefore has the dual advantage of enabling better stepping down between the 1st and 2nd transmission ratios, as described above, and of enabling starter device 38 to be positioned on the outside of housing 4. Clearly bearings 3a and 3ab are suitably sealed.

Clearly, the invention is not limited to the examples described and illustrated.

The transmission system need not necessarily be arranged in successive modules.

The starter brake could be of another nature, for example a band brake.

The brake could be operated by the vehicle's driver, for example by means of a conventional clutch pedal.

I claim:

1. A transmission apparatus in which a differential-type (7a) transmission device (1a) comprises rotating elements with intermeshing teeth, one of which elements is connected to an input shaft (2a) and the other to an output shaft (2ab) of the device, said rotating elements (8a, 9a, 13a) comprising a reaction element (13a) and the transmission apparatus further comprising selective locking means (16, 38) mounted operatively between the reaction element (13a) and a housing (4) of the transmission apparatus, the selective locking means comprising means having a free-wheel function (16a, 45) for enabling said reaction element (13a) to rotate in a same direction as said input shaft (2a) and said output shaft (2ab) when a selective connection device (18) connects at least indirectly the rotating elements of said differential mechanism (7) in order to cause direct drive operation, in which device, at least when the means having a free-wheel function is locked, said reaction element (13a) is integral in rotation with a rotor (37) of a brake being able to be selectively released in order to release said rotor (37) and said reaction element (13a) in relation to said housing (4) and to cause the transmission apparatus to operate in a neutral condition in which said brake allows the reaction element to rotate in a direction opposite to said same direction, said brake being able to be selectively and gradually activated so as to gradually immobilize said rotor (37) in relation to said housing (4), whereby said reaction element (13a) is then selectively immobilized and allowed to rotate in said same direction, respectively, in relation to the housing by the means having a free-wheel function, characterized in that said brake is a disc brake, the disc of which constitute said rotor (37).

2. A transmission apparatus according to claim 1, wherein the brake comprises a friction means (82) adapted to frictionally engage said disc;

a biasing means (83) biasing said friction means into engagement with said disc; and a brake release means (84) for selectively and controllably opposing said biasing means.

3. A transmission apparatus in which a differential-type (7a) transmission device (1a) comprises rotating elements with intermeshing teeth, one of which elements is connected to an input shaft (2a) and the other to an output shaft (2ab) of the device, said rotating elements (8a, 9a, 13a) comprising a reaction element (13a) and the transmission apparatus further comprising selective locking means (16, 38) mounted operatively between the reaction element (13a) and a housing (4) of the transmission apparatus, the selective locking means comprising means having a free-wheel function (16a, 45) for enabling said reaction element (13a) to rotate in the same direction as said input shaft (2a) and said output shaft (2ab) when a selective connection device (18) connects at least indirectly the rotating elements of said differential mechanism (7) in order to cause direct drive operation, in which device, at least when the means having a freewheel function is locked, said reaction element (13a) is integral in rotation with a rotor (37) of a brake being able to be selectively released in order to release said rotor (37) and said reaction element (13a) in relation to said housing (4) and to cause the transmission apparatus to operate in a neutral condition in which said brake allows the reaction element to rotate in a direction opposite to said same direction, said brake furthermore being able to be selectively and gradually activated so as to gradually immobilize said rotor (37) in relation to said housing (4), whereby said reaction element (13a) is then selectively immobilized and allowed to rotate in said same direction, respectively, in relation to the housing by the means having a free-wheel function, characterized in that the brake is an hydraulic pump (38) associated with closure means (40) for closing a delivery pipe (42) of said pump.

4. A transmission apparatus according to claim 3, characterised in that the hydraulic pump is a gear pump.

5. A transmission apparatus according to claim 4, characterised in that said rotor (37) of the brake is in the form of a wheel of a gear pump, meshing with several pumping pinions (39) distributed in a fixed position around the pumping wheel.

6. A transmission apparatus according to claim 5, characterised in that the pumping pinions are located and guided in rotation by being sealingly supported in cavities (51) integral with said housing (4).

7. A transmission apparatus according to claim 3 characterized in that said closure means (40) is controlled automatically by opposing means comprising a tachometric means (57, 89, 96, 58, 92) stressing said closure means (40) towards the closed position.

8. A transmission apparatus according to claim 7, characterised in that the tachometric means comprises a tachometric pump (58) driven by the output shaft of the transmission apparatus.

9. A transmission apparatus according to claim 7, characterised in that the tachometric means comprises a tachometric pump (57) driven by the input shaft (2a) of the transmission device (1a).

10. A transmission apparatus according to claim 9, characterised in that said tachometric pump (57) is connected to a relief valve (59) preventing the delivery pressure from overcoming a certain predetermined value.

11. A transmission apparatus according to claim 7, characterised in that the opposing means comprise means (93) for applying to said valve (40) the output pressure of the pump serving as said brake (38).

12. A transmission apparatus according to claim 3, characterised in that said means having a free-wheel function comprises a non-return valve (45) which by-passes the valve (40) for enabling the oil to flow freely in the pump in the opposite direction to that corresponding to the rotation that said rotor (37) tends to follow under the reaction torque undergone during operation by said reaction element (13a).

13. A transmission apparatus according to claim 7, characterised in that the reaction element (13a) is connected to the rotor of the brake (38) through said means having a free-wheel function (16a).

14. A transmission apparatus according to claim 1, characterised in that said rotor (37) is made solid in order to form an inertia flywheel.

15. A transmission apparatus according to claim 1, characterised in that the transmission device comprises an epicyclic train (7a) in which a sun gear (9a) is connected to said input shaft (2a), a crown wheel (8a) is connected to said output shaft (2ab), and a planet gear carrier (13a) constitutes the reaction element.

16. A transmission apparatus according to claim 1, characterised in that said transmission device (1a) comprises an epicyclic train (7a) in which a sun gear (9a) is connected to said input shaft (2a), a crown wheel (8a) is connected to said output shaft (2ab), and a planet gear carrier (13a) constitutes the reaction element, and in that the planet gear carrier supports in rotation cascades of planet gears (11a) each comprising an even number of planet gears which mesh together, each cascade comprising a planet gear (11a) meshing with said sun wheel (9a) and a planet gear (11b) meshing with said crown wheel (8a).

17. A transmission apparatus according to claim 15, characterised by comprising at least one second transmission device comprising an input crown wheel (8) connected to the said output shaft (2ab), a reaction sun gear (9) connected to said housing (4) by means of a free wheel (16) and an output planet gear carrier (13).

18. A transmission apparatus according to claim 16, characterised in that the output shaft (2ab) of said transmission device (1a) surrounds the input shaft (2) of said transmission device (1a), and in that said planet gear carrier (13a) is connected to said rotor (37) on the side of said epicyclic train (7a) which faces away from said input shaft (2a) and output shaft (2ab).

19. A transmission apparatus according to claim 18, characterised in that said input shaft (2a) is supported by a bearing (3a) in a hub (111) connecting said planet gear carrier (13a) to said rotor (37), and said hub (111) is supported by a bearing (3ab) in relation to said housing (4).

20. A transmission apparatus according to claim 1, characterised in that said brake (38) is located beyond one end of said housing (4) to which said transmission device (1a) is adjacent.

21. A transmission apparatus according to claim 15, characterised in that said input shaft (2a) comprises a shaft around which is mounted at least one second transmission device (1b, 1c) having an input shaft (2ab) connected to the output shaft of the transmission device equipped with said brake (38), so that an output shaft (2c) of the transmission apparatus is located on the side where said input shaft (2a) can be connected to a driving engine (5).

22. A transmission apparatus according to claim 1, comprising several successive modules (1a, 1b, 1c) mounted in series between an input shaft (2a) and an output shaft (2b), each module comprising a differential mechanism (7a, 7) with a reaction element (13a, 9) capable of being locked in relation to housing (4), characterised in that said brake (38) is fitted to the module (1a) which is operatively the closest to transmission input shaft (2a), and in that reaction elements (9) of the other modules (1b, 1c) can be locked directly in relation to said transmission housing.

23. A transmission apparatus according to claim 3 wherein the reaction element (13a) is connected to the rotor of the brake (38) through said means having a free-wheel function (16a).

24. A transmission apparatus according to claim 3 characterized in that said rotor (37) is made solid in order to form an inertia flywheel.

25. A transmission apparatus according to claim 3 characterized in that the transmission device comprises an epicyclic train (7a) in which a sun gear (9a) is connected to said input shaft (2a), a crown wheel (8a) is connected to said output shaft (2ab), and a planet gear carrier (13a) comprises the reaction element.

26. A transmission apparatus according to claim 3, characterized in that said transmission device (1a) comprises an epicyclic train (7a) in which a sun gear (9a) is connected to said input shaft (2a), a crown wheel (8a) is connected to said output shaft (2ab), and a planet gear carrier (13a) constitutes the reaction element, and in that the planet gear carrier supports in rotation cascades of planet gears (11a) each comprising an even number of planet gears which mesh together, each cascade comprising a planet gear (11a) meshing with said sun wheel (9a) and a planet gear (11b) meshing with said crown wheel (8a).

27. A transmission apparatus according to claim 25, characterized by comprising at least one second transmission device comprising an input crown wheel (8) connected to the said output shaft (2ab), a reaction sun gear (9) connected to said housing (4) by means of a free wheel (16) and an output planet gear carder (13).

28. A transmission apparatus according to claim 26, characterized in that the output shaft (2ab) of said transmission device (1a) surrounds the input shaft (2) of said transmission device (1a), and in that said planet gear carrier (13a) is connected to said rotor (37) on the side of said epicyclic train (7a) which faces away from said input shaft (2a) and output shaft (2ab).

29. A transmission apparatus according to claim 28, characterized in that said input shaft (2a) is supported by a bearing (3a) in a hub (111) connecting said planet gear carrier (13a) to said rotor (37), and said hub (111) is supported by a bearing (3ab) in relation to said housing (4).

30. A transmission apparatus according to claim 3, characterized in that said brake (38) is located beyond one end of said housing (4) to which said transmission device (1a) is adjacent.

31. A transmission apparatus according to claim 25, characterized in that said input shaft (2a) comprises a shaft around which is mounted at least one second transmission device (1b, 1c) having an input shaft (2ab) connected to the output shaft of the transmission device equipped with said brake (38), so that an output shaft (2c) of the transmission apparatus is located on the side where said input shaft (2a) can be connected to a driving engine (5).

32. A transmission apparatus according to claim 3, comprising several successive modules (1a, 1b, 1c) mounted in series between an input shaft (2a) and an output shaft (2b), each module comprising a differential mechanism (7a, 7) with a reaction element (13a, 9) capable of being locked in relation to housing (4), characterized in that said brake (38) is fitted to the module which is operatively the closest to transmission input shaft (2a), and in that reaction elements (9) of the other modules (1b, 1c) can be locked directly in relation to said transmission housing (4).

* * * * *

UNITED STATES PATENT AND TRADEMARK OFFICE
CERTIFICATE OF CORRECTION

PATENT NO. : 5,655,984
DATED : August 12, 1997
INVENTOR(S) : Roumen Antonov

It is certified that error appears in the above-identified patent and that said Letters Patent is hereby corrected as shown below:

Column 7, line 57, delete "moment" and insert --among--;

Column 8, line 55, delete "1ais" and insert -- 1a is--;

Column 9, line 55, after "either" insert --to--;

Column 10, line 1, delete "his" and insert --this--;

Column 10, line 34, delete "mere" and insert --more--;

Column 14, line 6, delete "7" and insert --1--;

Column 15, line 32, delete "carder" and insert --carrier--;

Column 16, line 23, delete "3" and insert --1--.

Signed and Sealed this

Ninth Day of June, 1998

BRUCE LEHMAN

*Attest:*

*Attesting Officer*     *Commissioner of Patents and Trademarks*